US011157258B2

(12) United States Patent
Attard (10) Patent No.: US 11,157,258 B2
(45) Date of Patent: Oct. 26, 2021

(54) SYSTEMS AND PROCESSES FOR UPDATING COMPUTER APPLICATIONS

(71) Applicant: ATLASSIAN PTY LTD, Sydney (AU)

(72) Inventor: Samuel Attard, Auckland (NZ)

(73) Assignee: ATLASSIAN PTY LTD., Sydney (AU)

( * ) Notice: Subject to any disclaimer, the term of this patent is extended or adjusted under 35 U.S.C. 154(b) by 0 days.

(21) Appl. No.: 15/815,509

(22) Filed: Nov. 16, 2017

(65) Prior Publication Data

US 2019/0146773 A1    May 16, 2019

(51) Int. Cl.
| | |
|---|---|
| *G06N 20/00* | (2019.01) |
| *G06F 8/65* | (2018.01) |
| *G06F 8/61* | (2018.01) |
| *H04L 9/08* | (2006.01) |
| *G06F 21/62* | (2013.01) |
| *H04L 29/06* | (2006.01) |
| *G06F 8/71* | (2018.01) |

(52) U.S. Cl.
CPC ............... *G06F 8/65* (2013.01); *G06F 8/61* (2013.01); *G06F 21/6218* (2013.01); *H04L 9/0891* (2013.01); *H04L 9/0894* (2013.01); *H04L 63/08* (2013.01); *G06F 8/71* (2013.01); *G06F 2221/2107* (2013.01)

(58) Field of Classification Search
CPC ..... H04L 9/0894; H04L 63/08; H04L 9/0891; H04L 67/10; G06F 8/65; G06F 8/61; G06F 21/6218; G06F 8/71; G06F 2221/2107; G06N 20/00
USPC .......................................... 717/100–124, 169
See application file for complete search history.

(56) References Cited

U.S. PATENT DOCUMENTS

| | | | |
|---|---|---|---|
| 6,725,453 B1 * | 4/2004 | Lucas .................. | G06F 8/65 717/173 |
| 7,707,571 B1 * | 4/2010 | Harris .................. | G06F 8/61 717/174 |
| 7,725,716 B2 * | 5/2010 | Tidwell .............. | G06F 21/6209 713/168 |

(Continued)

OTHER PUBLICATIONS

Mike Wood, "An Introduction to Windows Azure BLOB Storage", Jul. 12, 2013) (Year: 2013).*

*Primary Examiner* — Chat C Do
*Assistant Examiner* — Noor Alkhateeb
(74) *Attorney, Agent, or Firm* — Brownstein Hyatt Farber Schreck, LLP (57) ABSTRACT

An update system is provided. The system includes a database for storing application release information for one or more previous versions of a computer applications and a current version of the computer application. The system further includes an update manager configured to: receive an application release request, the application release request comprising a release file and application release information associated with the current version of the computer application; store at least a portion of the application release information of the current version of the computer application in the database; retrieve application release information corresponding to the one or more previous versions of the computer application and the current version of the computer application from the database; automatically generate release metadata based at least in part on the retrieved application release information; and store the release metadata and the release file in a file store for retrieval and installation by a computer application executing on a user computing device.

10 Claims, 7 Drawing Sheets

(56) References Cited

U.S. PATENT DOCUMENTS

| | | | | |
|---|---|---|---|---|
| 8,595,714 B1* | 11/2013 | Hamer | G06F 8/65 | 709/201 |
| 8,806,471 B2* | 8/2014 | Vidal | G06F 8/65 | 717/168 |
| 2004/0215755 A1* | 10/2004 | O'Neill | G06F 8/654 | 709/223 |
| 2006/0293914 A1* | 12/2006 | Fukuoka | | 705/1 |
| 2007/0244905 A1* | 10/2007 | Ito | G06F 8/65 | |
| 2010/0107150 A1* | 4/2010 | Kamada | G06F 8/65 | 717/170 |
| 2010/0146303 A1* | 6/2010 | Kothari | G06F 12/1408 | 713/193 |
| 2013/0024852 A1* | 1/2013 | Firman | G06F 8/60 | 717/170 |
| 2013/0132938 A1* | 5/2013 | Agarwal | H04W 4/21 | 717/173 |
| 2013/0332916 A1* | 12/2013 | Chinn | G06F 8/65 | 717/169 |
| 2014/0196020 A1* | 7/2014 | Shetty | G06F 8/658 | 717/171 |
| 2015/0101021 A1* | 4/2015 | McErlean | G06F 8/61 | 726/4 |
| 2015/0278531 A1* | 10/2015 | Smith | H04L 9/30 | 713/165 |
| 2016/0191249 A1* | 6/2016 | Panchapakesan | H04L 9/3242 | 713/168 |
| 2017/0068405 A1* | 3/2017 | Lue-Sang | G06F 3/0482 | |
| 2017/0134494 A1* | 5/2017 | Xie | H04L 67/1097 | |
| 2017/0374425 A1* | 12/2017 | Disley et al. | H04N 21/4788 | |
| 2018/0032323 A1* | 2/2018 | Roy | G06F 8/65 | |

* cited by examiner

SYSTEMS AND PROCESSES FOR UPDATING COMPUTER APPLICATIONS

TECHNICAL FIELD

Aspects of the present disclosure are directed to systems and processes for updating computer applications.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

To operate/perform/facilitate various functions, computer applications are installed on computing devices. These may include communication applications such as HipChat and Stride, project management applications such as Trello, and document preparation and presentation applications such as Microsoft Word, Microsoft Excel etc. These computer applications are typically installed on computing devices from where they are executed as and when required.

Often, developers of these computer applications or even organization administrators may wish to update one or more aspects of these applications after their release, e.g., to introduce a new feature, to update a currently offered feature, or to rectify an issue with the computer application. Updating these applications on user computing devices can often be cumbersome, complex, and expensive.

SUMMARY

The appended claims may serve as a summary of the invention.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form to avoid unnecessary obscuring.

These days, most computer applications can be automatically updated. To do this, generally speaking, application developers commission an update server onto which they upload the latest release for a particular computer application. The corresponding computer application (installed on user computing devices) can be configured to periodically (e.g., every time the application is started, every hour, every week, etc.) query this update server for release updates—typically by providing the update server the latest application version currently installed on the user computing device. In response, the update server checks whether that version corresponds to the latest application release version available at the update server. If it determines that a newer version is available, the update server forwards the release files corresponding to the latest release to the requesting computer application. The computer application then installs the update.

Although this arrangement allows computer applications to be updated automatically, it is rather expensive and has a few security issues. First, commissioning an update server has associated running and administrative costs and these costs scale linearly with the number of application users—i.e., the more the number of users, the more the costs of running the update server. It will be appreciated that for popular computer applications, this can become quite expensive. Second, in instances where the update server is located in the cloud, it may be susceptible to security threats. For example, a person may hack into the update server and upload fraudulent application updates or viruses. As computer applications are typically configured to automatically query the update server for new releases, it will be appreciated that the fraudulent release/virus may very quickly be released and installed on a large number of computer devices in a very short period of time.

To overcome one or more of these issues, aspects of the present disclosure are directed to an update system and process that eliminates the need for such an update server. Instead, aspects of the present disclosure employ an update manager that is configured to store application release information internally and use this information to generate release metadata whenever a new release is submitted to the update manager. The release metadata includes information about the various release versions available for a particular computer application. The update manager then stores this release metadata along with the new release on a file store. The update manager uses an authenticated connection to the file store and only the update manager is permitted to write or update the file store; client computers and client update services or apps have read-only access to the file store.

As used herein, the term file store generally refers to a remotely accessible read-only file system. As opposed to a database that stores data in key-value pairs in multiple relational tables, the file store can store release files in a single table, or can store release metadata and release files together in flat files in an archived format such as ZIP. Furthermore, the file store may be exposed via a suitable endpoint, such as HTTP, that does not require the use of encryption or an authenticated connection to a server. In the HTTP example, user devices can read files from the file store by accessing a domain (e.g., my-file-store.com) with the file path as the HTTP path (e.g., my-filestore.com/path/to/file.exe). Some examples of file stores include Amazon S3, and Microsoft Azure Blob storage. Using this approach, update services or apps at client computers can obtain files from the file store without update server bottlenecks, at lower cost and greater speed and efficiency without using transactions, database queries or other heavyweight server retrieval techniques.

Using the presently disclosed systems and methods, a corresponding computer application executing on a computing device may use a file read operation to test at the file store for the release metadata whether an update is required, retrieve the corresponding release file(s) from the file store (if it determines that an update is required), and apply the update. For example, a read operation that includes a version number in a filename may be used to determine if an update is required because the read operation will fail if a file with that version number in the filename is not available and cannot be read. If it can be read, then the file can include both release metadata and release update files in a single archive file. Or, in another embodiment, a query and response protocol can be used to first query the release metadata whether an update is available, and then retrieve an archive file, one or more flat file or other files containing the release.

In certain embodiments, the presently disclosed update manager may be privately hosted, e.g., on the application developer's local infrastructure, such as the local intranet. The file store may be publicly hosted, e.g., on a publicly accessible infrastructure, such as a cloud platform. Further, the file system may be access controlled such that only the update manager is able to submit releases and metadata files to the file store, but any person or computing application may access the release metadata and corresponding releases on the publicly hosted file store, thereby improving system security. Furthermore, as there is no need to commission an update server, the presently disclosed update system and process can lead to reduced infrastructure costs for updating computer applications.

For organizations that develop more than one application, for example organizations such as Atlassian, Microsoft and Oracle, one update manager may be utilized for releasing updates for all their computer applications, thereby eliminating the need for an update server for each individual computer application, further reducing update costs.

Furthermore, in certain cases, application developers may release application updates at different stages of a development cycle and typically do this by releasing updates through different 'release channels'. For example, an alpha release channel may be utilized to release alpha tested software updates to a small group of users, a beta channel may be utilized to release beta tested updates to users, and a stable channel may be utilized to release fully tested and stable application updates to users.

It will be appreciated that different application developers may utilize different names for these channels and may utilize more or fewer number of release channels for their computer applications. For instance, some application developers may only release fully tested and stable computer application updates, whereas others may release beta versions of the updates as well.

When application developers utilize multiple release channels, aspects of the presently disclosed update systems and methods may be utilized to release updates for multiple release channels.

In addition, the update manager can provide access control techniques, such as user based and token based authentication, for uploading releases, and user based authentication for confirming/approving the release of an upload, again enhancing system security. These and other features of the update manager will be described with reference to FIG. 1, FIG. 2, FIG. 3, FIG. 4, FIG. 5, FIG. 6 and FIG. 7.

Systems Overview

Figure 1:
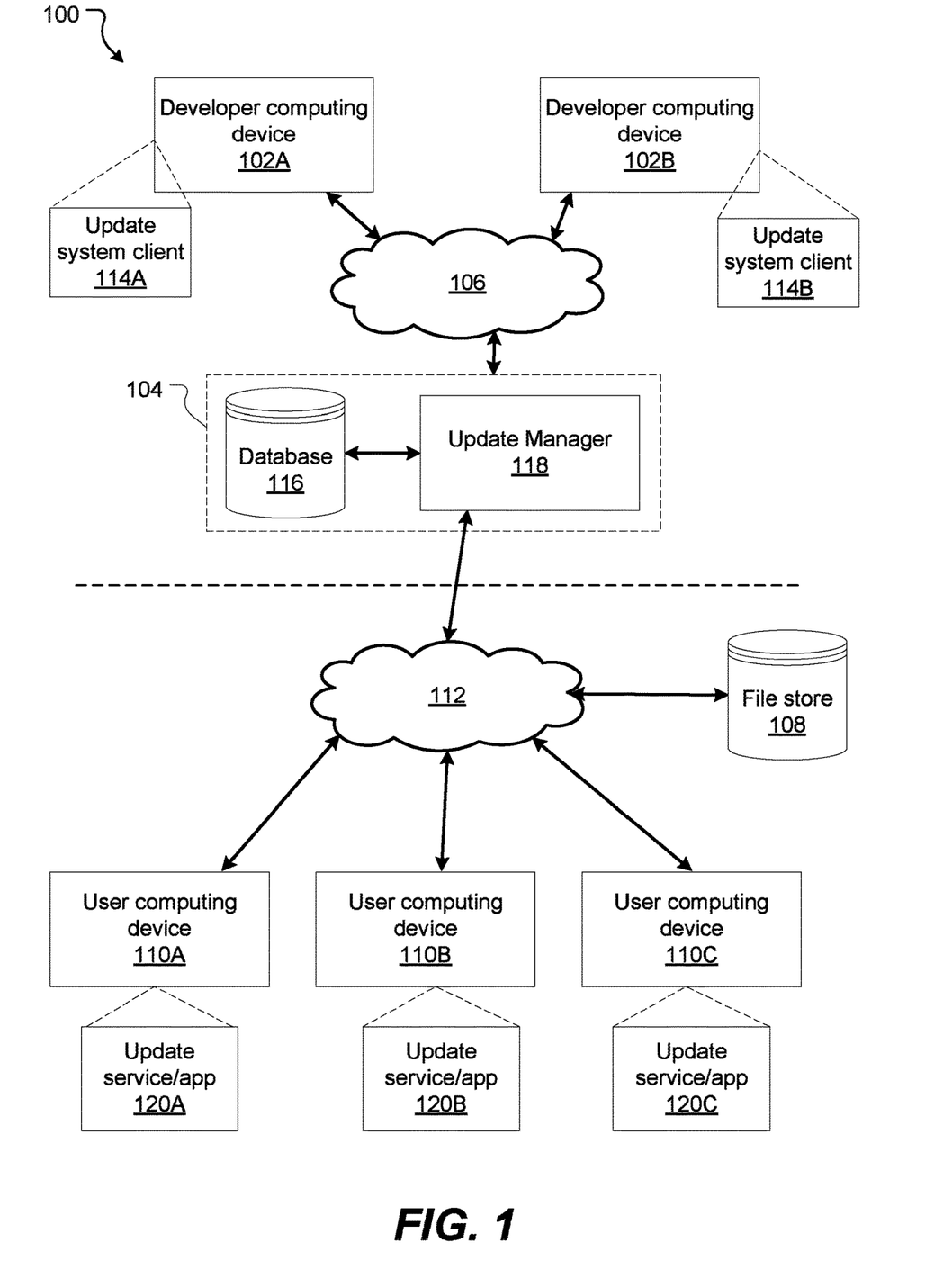
FIG. 1 depicts an exemplary environment in which features of the present disclosure may be employed.

FIG. 1 is a block diagram of an exemplary environment 100 in which features of the present disclosure may be employed.

The environment 100 includes multiple developer computing devices 102A, 102B in communication with an update system 104 via a communication network 106. The update system 104 is also in communication with a file store 108, which is also in communication with multiple user computing devices 110A, 110B, 110C via a communication network 112.

In some embodiments, the developer computing devices 102A, 102B and the update system 104 communicate with each other as part of a private network behind a firewall—i.e., the communication network 106 may be a private communication network such as a local area network (LAN), whereas the file store 108 and the user computing devices 110A, 110B, 110C may exchange data over a public communication network—i.e., communication network 112 may be a public network such as the Internet.

Each developer computing device 102A, 102B may be any suitable computing device, for example a mobile device (e.g. a tablet or mobile phone), a portable device (such as laptop computer), or any other computing device (e.g. a desktop computer). A developer (not shown) may interact with the update system 104 via the developer computing devices 102A, 102B. Although only two developer computing devices 102A, 102B are illustrated here, it will be appreciated that the environment 100 may support multiple developer computing devices and each of these may be configured to exchange data with the update system 104.

Typically, a developer computing device 102A, 102B includes one or more computer programming and source code applications (not shown) that may be utilized to create and/or update computer applications. The computing device 102A, 102B may also include one or more software testing modules that allow a developer to run and test their builds.

To communicate with the update system 104, the developer computing device 102A, 102B may further include an update system client 114. When invoked, the update system client 114 facilitates communication between the developer computing device 102A, 102B and the update system 104.

The update system 104 is configured to manage computer application release requests received from one or more developer computing devices 102A, 102B. To this end, the update system 104 includes an information database 116 configured to store application release information for received application release requests and an update manager 118 configured to generate release metadata for the requested application release. The update manager 118 is also configured to store the release metadata and the received release file on the file store 108.

Operation of the update system 104 will be described in detail with reference to FIGS. 2-7 below.

The file store 108 is configured to store release files and release metadata for one or more computer applications, receive requests for the release metadata and/or one or more release files and respond to these requests with the corresponding information/files. In an embodiment, file store 108 is programmed or configured to accept write or update operations only from update manager 118 via an authenticated connection that is established in advance using security credentials, and to accept only read requests from user computing devices 110A, 110B, 110C without using an authenticated connection. That is, only update manager 118 is permitted to write files to file store 108, via an authenticated connection through which the file store verifies the identity of the update manager prior to executing a write request, and user computing devices 110A, 110B, 110C have read-only access to files on file store 108. With this arrangement, update service/apps 120A, 120B, 120C of user computing devices 110A, 110B, 110C may be programmed to retrieve files from file store 108 using a lightweight read operation that does not require a special transaction, authenticated connection or other elaborate, multiple-message interoperation with the file store 108, thus providing a distinct benefit and improvement over an update server approach. In an embodiment, file store 108 stores release metadata and/or one or more release files in archived, compressed and/or encrypted format, such as using ZIP file format. In some embodiments, the file store 108 may be hosted on a cloud platform. The cloud platform typically includes several physical systems (such as processors and memory) operated and hosted by a cloud provider such as Amazon (AWS). The physical systems of the cloud platform host (or themselves are) resources (real or virtual) for end users. For example, the cloud platform may host/provide several file stores 108.

In certain embodiments, the cloud platform may also provide access control techniques to prevent unauthenticated users/computing devices from uploading releases or metadata files on the file store.

The user computing device 110A, 110B, 110C may be any suitable device, for example a mobile device (e.g. a tablet or mobile phone), a portable device (such as laptop computer), or any other computing device (e.g. a desktop computer). While three user computing devices are shown many user devices can interact with the file store 108 in reality.

Each user computing device 110A, 110B, 110C includes one or more local computer applications (not shown). Examples of local computing applications include Stride, Trello and Companion all developed and provided by Atlassian. The client applications include instructions and data stored in the memory (e.g. non-transient compute readable media) of the user computing devices 110A, 110B, 110C on which the applications are installed/run. These instructions are executed by a processor of the user computing device 110A, 110B, 110C to perform various functions. By way of example, a given computer application may include an update service function 120A, 120B, 120C (shown as update service/application 120A, 120B, 120C in FIG. 1) which queries the file store 108 for release metadata corresponding to the computer application, checks if the release metadata indicates that the computer application stored on the user device requires updating, and if updating is required, fetches the relevant release file(s) from the file store 108 and applies the update.

In other examples, the user computing device 110A, 110B, 110C may include an independent update application which is configured to perform the functions of the update service described above for multiple computer applications installed on the user computing device 110A, 110B, 110C.

Each user computing device 110A, 110B, 110C also includes an operating system (which in itself is a computer application) that manages hardware and software resources and provides services for the computer applications. Example operating systems include Microsoft Windows and MacOS for desktops and laptops, and Android and iOS for mobile computing devices.

Exemplary Update System and Process

Figure 2:
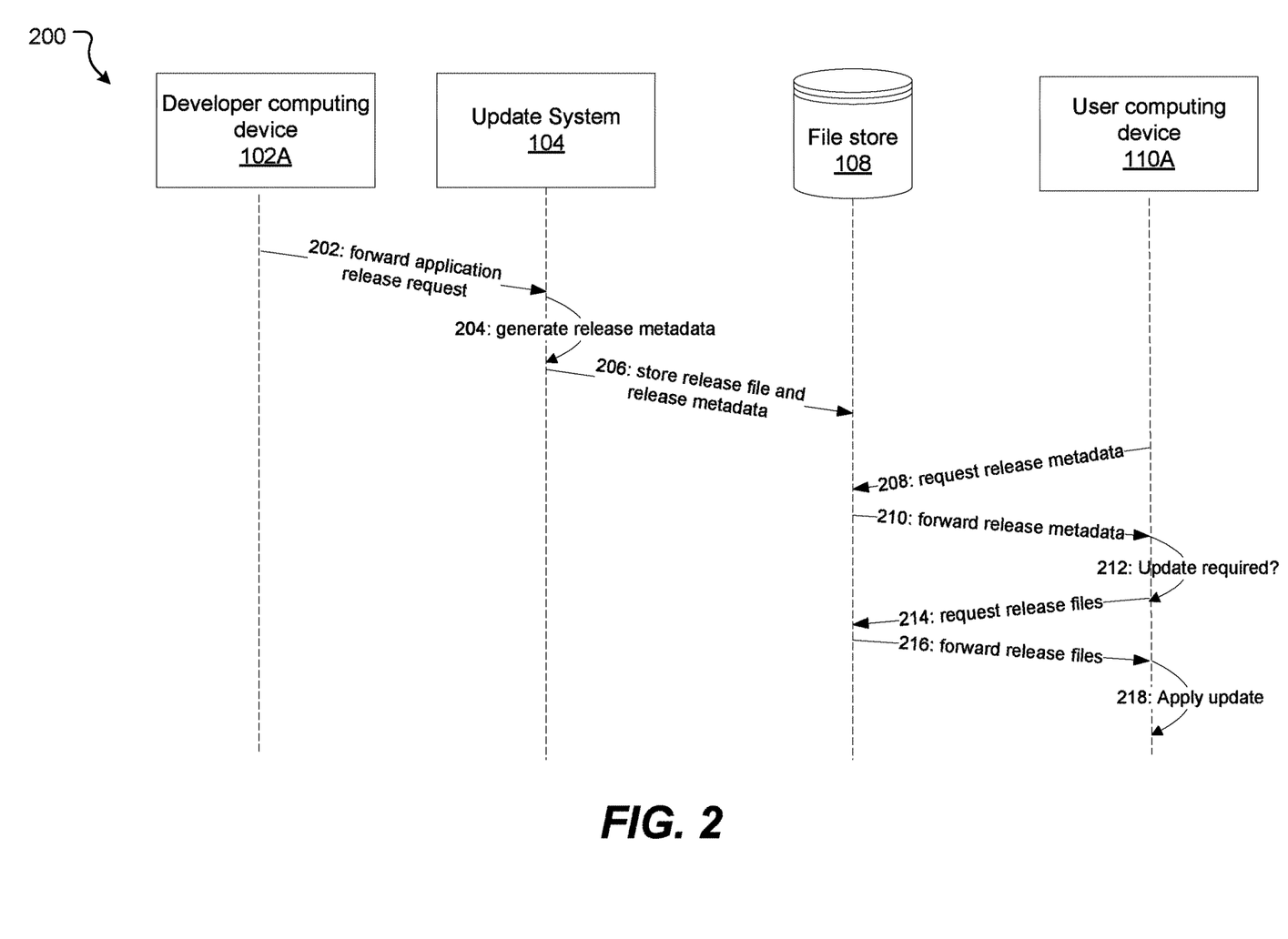
FIG. 2 is a message-passing diagram illustrating a high-level process for updating a computer application in accordance with certain embodiments.

This section describes the operations performed by the systems described with reference to FIG. 1 in updating a computer application according to aspects of the present disclosure. For ease of description, the present process 200 is described with reference to a single application release request for a particular computer application (e.g., Stride) to be released on a particular release channel (e.g., beta channel) and for a particular operating system (e.g., Darwin). However, it will be appreciated that the process 200 can be performed for updating multiple computer applications for one or more release channels and/or operating systems without departing from the scope of the present disclosure.

The process 200 begins at step 202, where a developer computing device (e.g., developer computing device 102A) forwards an application release request to the update system 104. The application release request may be for releasing a new version, e.g., version 1.0.10, of a particular application. The application release request includes one or more release files. Typically, the request includes at least two release files—an update file and an installer file. The update file includes information essential to update the computer application already installed on a user device from a previous version (e.g., 1.0.0) to the latest/current version (e.g., 1.0.10). This is typically a source code file including the portion of the source code that was updated in this particular release. The installer file includes information essential to install version 1.0.10 of the computer application on a user computing device. This is typically the entire source code for version 1.0.10 of the application. Some computer applications use the update file to compile the entire source code on the user computing device before installing the updated version, whereas other computer applications may use the installer file. Use of the installer file circumvents the need to compile the updated source code on the user computing device before installing the updated version.

The update system 104 receives the application release request and the release files and at step 204 generates release metadata for this release. The release metadata is data that describes the current release. It may include information about the release number, the computer application for which the release is, the date/time of the release and a link to the location of the corresponding release file(s) in the file store 108.

At step 206, the update system 104 stores the computer application release metadata and the corresponding release files in the file store 108. The release files may be stored in the location mentioned in the release metadata. As part of step 206, the update system 104 may establish an authenticated connection with the file store 108 using a cryptographic protocol, proving the knowledge of a key or nonce, presenting a digital certificate for validation, presenting a message authentication element that only the file store can decrypt, using an extensible authentication protocol exchange, or other approaches. The particular authentication technique is not critical and what is important is that update system 104 can only write to the file store 108 or update the file store if the update system is authenticated to the file store.

Step 208 may be performed any time after step 206, such as whenever an update service/application 120A is executed on the user computing device 110A. In step 208, a user computing device requests the file store 108 for release metadata for that particular computer application and operating system. For example, user computing device 110A sends a query in a specified protocol to the file store 108 that requests release metadata. Or, user computing device 110A attempts a read operation for files that contain a particular release number in the filename, which will fail if that release is not available and will succeed if the release is available. In an embodiment, the request or read operation between the user computing device and the file store can use non-authenticated protocols, messages, queries, or programmatic calls.

At step 210, the file store 108 forwards the requested release metadata to the user computing device 110A. Or, the file store 108 may complete a file read operation by returning files for a release.

At step 212, the user computing device 110A determines whether an update is required based on the release metadata. If it determines that an update is required, the user computing device 110A at steps 214 and 216 requests the file store to forward the corresponding release files and receives the requested release files. Or, the user computing device 110A performs file read operations using ordinary distributed filesystem calls to obtain one or more release files that are identified in the release metadata. Release metadata and release files may be packaged together in archive files such as ZIP files.

At step 218, the user computing device 110A updates the computer application to the current version.

Developer Computing Device Operation

Figure 3:
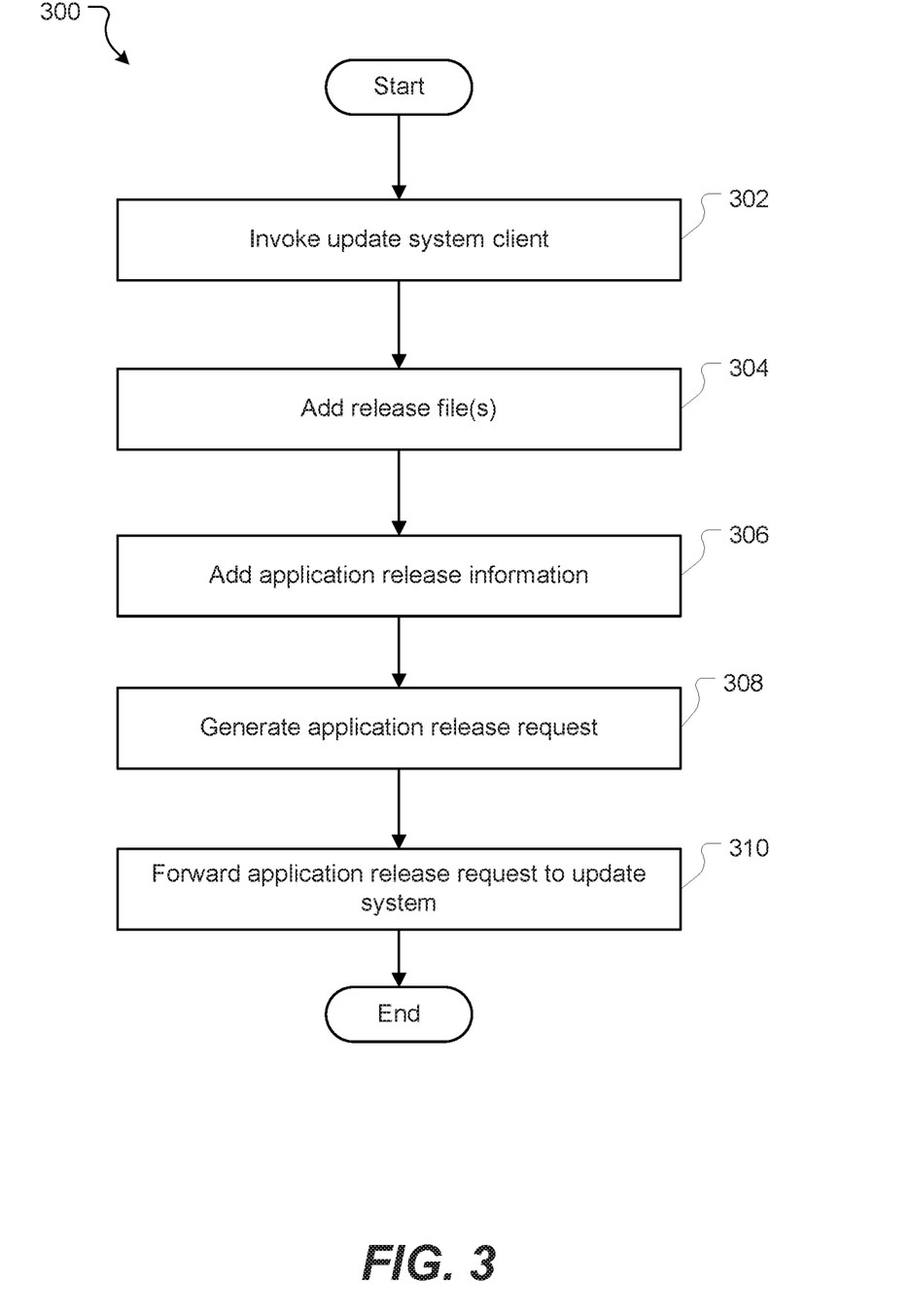
FIG. 3 is a flowchart illustrating operation of a developer computing device according to aspects of the present disclosure.

FIG. 3 illustrates an exemplary process 300 performed by a developer computing device to forward an application release request to the update system.

Once a developer has developed an update for a computer application for a particular release channel and/or operating system, the developer may invoke the update system client 114 to initiate release of the update.

The process begins at step 302, where the update system client 114 is invoked. Once invoked, the update system client 114 may render a user interface on a display of the developer computing device 102A, 102B. It will be appreciated that the update system client 114 may support any type of user interface including a command line interface, a graphical user interface, or a menu driven interface. The user interface allows the developer to interact with the update system client 114.

At step 304, the update system client 114 may be utilized to add one or more release files associated with the release. In certain embodiments, the update client 114 may be integrated with the developer's local file management system, allowing the developer to select and add one or more files from the local file management system.

At step 306, the update system client 114 prompts the developer to add information in relation to the release. This information could include information describing the application release such as, but not limited to, a version identifier, an application identifier, a release channel identifier, an operating system identifier, a platform identifier, a unique identifier identifying a combination of a particular application and release channel, and/or a description of the update.

Next, the process 300 proceeds to step 308 where the update system client 114 generates an application release request.

The application release request includes the release files and the information about the release added at steps 304 and 306, respectively. In certain embodiments, the release information may be serialized for transmission from the update system client 114 to update manager 118. Any suitable serialization format may be utilized such as a JSON object, a BSON object, messagepack file, YAML file, etc.

At step 310, the update system client 114 forwards the application release request including the release files and the application release information to the update manager 118.

It will be appreciated that the update system client 114 may also be configured to check whether a release file is added or not at step 304, whether sufficient application release information is provided at step 306, and/or whether the right type of release file is added or not. For example if a release file is not detected at step 304, or an incorrect or invalid value is identified for a particular application release information field in step 306, or the file extension of an added release file does not match a suitable extension for a source code update or installer file, the update system client 114 may alert the developer and request the developer to retry adding the release file, check the entered application release information, and/or check whether the right release file is added to the request.

In certain embodiments, once the update manager 118 publishes release files on the file store 108, the update manager 118 may send a confirmation to the update system client 114. This confirmation may be displayed on the user interface rendered by the update system client 114.

Update System Operation

Figure 4:
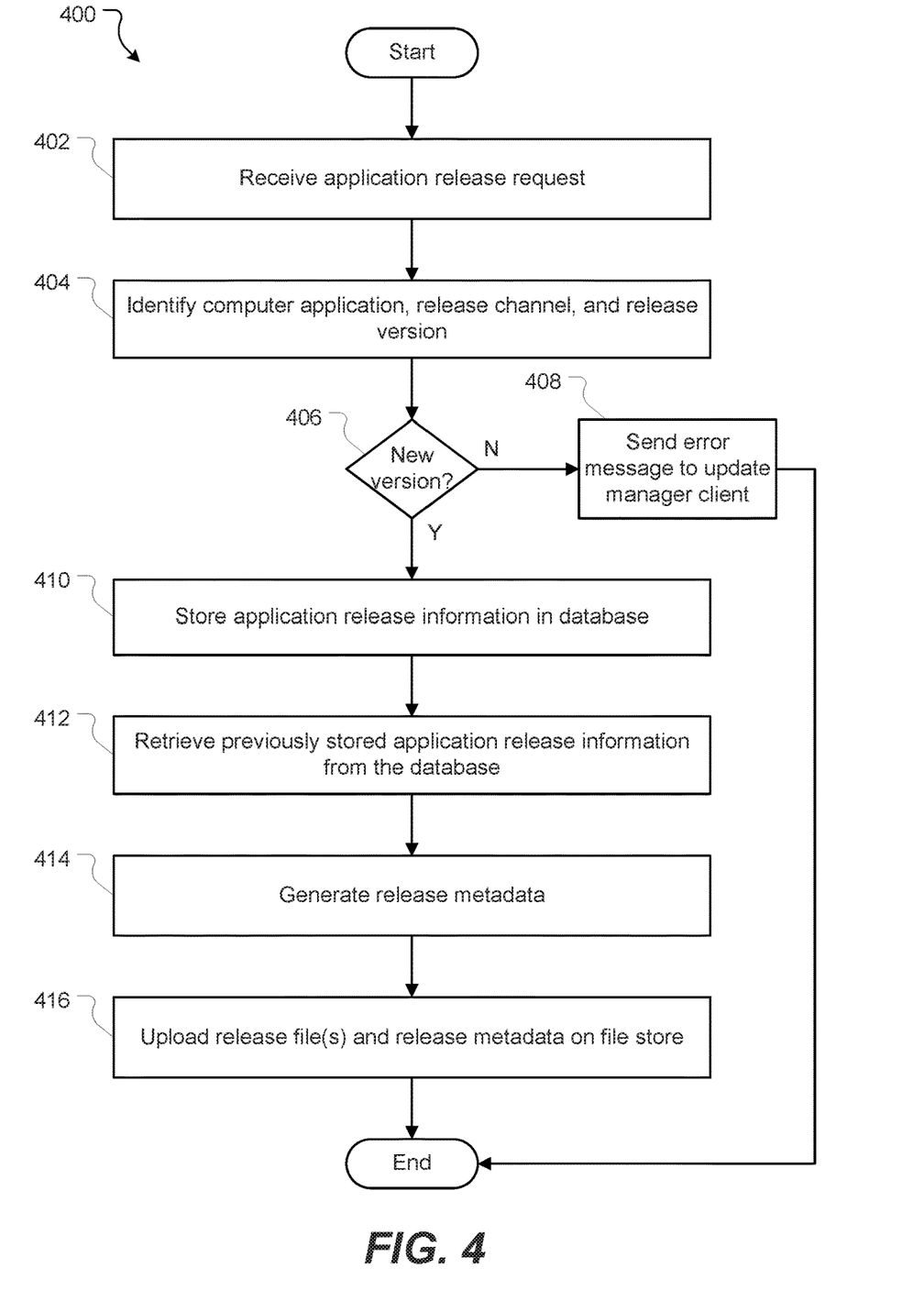
FIG. 4 is a flowchart illustrating operation of an update system according to aspects of the present disclosure.

FIG. 4 is a flowchart illustrating exemplary operations performed by the update system 104 to publish a release corresponding to the application release request forwarded by the client 114 in step 310.

The process begins at step 402, where the update system 104 and the update manager 118 receives the application release request from the update system client 114. As noted previously, the request includes one or more release files and application release information (if provided).

At step 404, the update manager 118 identifies information about the release such as the computer application, the release version, and the release channel corresponding to the application release request. In some embodiments, this determination is made based on the application release information received from the developer computing device 102A, 102B. Alternatively, it may be made based on the name of the update and/or installer files (e.g., if no application release information is available).

The update manager 118 may subsequently determine whether the currently received release request is for a new version of the identified computer application, at step 406. To this end, the update manager 118 may compare the received version identifier with the latest/current version identifier for that computer application stored in the information database 116. If at step 406, the update manager 118 determines that the version identifier is equal to or lower than the latest stored version number for the computer application, the process proceeds to step 408 where the update system generates an error message and forwards the error message to the update system client. The error message in one example may notify the developer that the version already exists.

Alternatively, if at step 406, the update manager 118 determines that the version identifier is not equal to or lower than the latest stored version number for the computer application, the process proceeds to step 410, where the update manager 118 stores at least part of the application release information received from the developer computing device 102A, 102B in the information database 116. This may be done in multiple ways. For example, in case the release information is provided in a JSON object (which stores release information in name-value pairs), the update manager 118 may parse the JSON object for the name-value pairs and store at least some of these in the database 116.

As described previously, the information database 116 stores application release information in respect to one or more computer applications. A variety of application release information may be recorded and stored for a given application release, e.g., against a unique release ID. For a given release ID, such information may include, e.g., information about the corresponding computer application, the corresponding release channel, the corresponding operating system, the particular application version, the time/date when the release was received, and a location where release files corresponding to the release are stored. An example of a data structure storing release information is illustrated in Table A below. Although a table is used to illustrate the data structure, the relevant information need not be stored in a table and could be stored in any other appropriate format. Furthermore, it will be appreciated that the information depicted in the example table A is merely representative and the data structure may include additional, fewer, or alternative fields without departing from the scope of the present disclosure.

Returning to FIG. 4, at step 412, the update manager 118 retrieves previously stored application release information for the computer application and release channel identified in step 404. In certain embodiments, this information is retrieved from the database 116. For example, if the identified computer application is 'Test1' and the identified release channel is 'beta', the update manager 118 requests the database 116 to retrieve all records corresponding to the computer application ID 'Test1' and the release channel ID 'beta'.

At step 414, the update manager 118 generates release metadata based in part on the release information retrieved at step 412. The release metadata includes release information of all versions of the identified computer application for a given release channel. Generally speaking, the release metadata includes the version identifier for each version and a link to the location of the underlying release file on the file store (retrieved from the database 116). In certain embodiments, the release metadata may include other information such as the publication date of each version, and notes/comments for each version. Although the version number and other release information may be retrieved from the

TABLE A

Example application release information

| Release ID | Version no. | App ID | Channel ID | Operating system | Release date | Release name | Comment | Location |
|---|---|---|---|---|---|---|---|---|
| 839478 | 1.0.1 | Test 1 | alpha | Darwin | Mon Oct. 2, 2017 14:11:16 GMT + 0 | 1.0.1 | None | https://update.dev.abc.io/Test1/alpha/darwin/x64/test-darwin-x64-1.0.1.zip |
| 839479 | 1.2.5 | Abc3 | beta | iOS | Mon Oct. 2, 2017 16:10:30 GMT + 0 | | Security update | https://update.dev.abc.io/Abc3/beta/iOS/test-darwin-x64-1.2.5.zip |
| 839480 | 1.0.1 | Test 1 | stable | Windows OS | Tue Oct. 3, 2017 04:11:15 GMT + 0 | 1.0.1 | None | https://update.dev.abc.io/Test1/stable/WindwsOS/test-windowsOS-1.0.1.zip |
| ... | ... | ... | ... | | ... | ... | ... | ... |

In the above example table, for each unique release ID, the information database 116 stores:

Version number indicates the version of the computer application at the time of the current release.

Application ID to identify the particular computer application associated with the current release.

Channel ID to identify the release channel for which the current release is applicable.

Operating system ID identifies the operating system for which the current update is developed.

Release date indicates the date and/or time at which the application release request is received at the update system.

Release name indicates the name provided by the developer of the application release for the release. The release name may be the same as the release version or any other suitable name provided by the developer.

Comments include any comments entered by the developer when sending the application release request.

Location indicates the file store file path where the release files corresponding to this release ID are stored. The location may be in the form of a URL in some examples.

database 116, the location link has to be generated by the update manager at this step. In certain embodiments, the update manager 118 generates the location of the file based on a preconfigured known "domain" that the file store is hosted on. That domain is then suffixed with the path on which the release file is positioned e.g., <<domain>>/AppID/ChannelID/OperatingSystem/Architecture/FileName.

In certain embodiments, the release metadata may be in the form of a metadata file that is maintained for that particular combination of computer application and release channel.

Table B below illustrates part of an example metadata file for the 'Test-1' computer application in the iOSx64 release channel. In the example, the metadata table includes fields to indicate the version number and name, the publication date and time of the update, any developer notes and a URL of the location of the update file corresponding to each update. The metadata file also includes a data field indicating the latest release version for that computer application and release channel combination. To date, the computer application in this example has been updated 11 times, with version 1.0.10 being the current version.

TABLE B

Example release metadata file

```
{
    "releases": [
      {
        "version": "1.0.0",
        "updateTo": {
          "version": "1.0.0",
          "pub_date": "Mon Oct 02 2017 14:11:16 GMT+0000 (UTC)",
          "notes": "",
          "name": "1.0.0",
          "url": "https://update.dev.abc1.io/Test-1/alpha/darwin/x64/test-darwin-x64-
1.0.0.zip"
        }
      },
      {
        "version": "1.0.1",
        "updateTo": {
          "version": "1.0.1",
          "pub_date": "Mon Oct 02 2017 14:12:56 GMT+0000 (UTC)",
          "notes": "",
          "name": "1.0.1",
          "url": "https://update.dev. abc1.io/Test-1/alpha/darwin/x64/test-darwin-x64-
1.0.1.zip"
        }
      },
      {
        "version": "1.0.2",
        "updateTo": {
          "version": "1.0.2",
          "pub_date": "Mon Oct 02 2017 14:14:15 GMT+0000 (UTC)",
          "notes": "",
          "name": "1.0.2",
          "url": "https://update.dev. abc1.io/Test-1/alpha/darwin/x64/test-darwin-x64-
1.0.2.zip"
        }
      },
      ...
      {
        "version": "1.0.10",
        "updateTo": {
          "version": "1.0.10",
          "pub_date": "Mon Oct 02 2017 14:54:25 GMT+0000 (UTC)",
          "notes": "",
          "name": "1.0.10",
          "url": "https://update.dev. abc1.io/Test-1/alpha/darwin/x64/test-darwin-x64-
1.0.10.zip"
        }
      }
    ],
    "currentRelease": "1.0.10"
}
```

Returning to FIG. 4, at step 416, the update manager 118 is configured to upload the release file(s) received from the developer computing system at step 402 to the location mentioned in the release metadata. The release metadata is also uploaded to the file store 108 at this step.

Depending on the access control technique utilized by the file store 108, the update manager 118 may be configured to forward the release files and metadata along with one or more security credentials so that the file store 108 can authenticate the update manager before publishing the release files and metadata on the file store 108. For instance, in case of Amazon S3, the update manager 118 may be configured to generate a POST request including an access key ID and a signature calculated from the secret access key and the contents of the request. Amazon then also creates a signature based on the secret access key stored in the Amazon database and the request message received from the update manager 118. If the signature created by AWS matches the signature received with the POST request, the file store authenticates the update manager 118.

It will be appreciated that this is just one way for managing access at the file store 108 and that in other implementations other access control techniques may be employed such as using basic username password authentication, OAuth, or other hash based message authentication techniques without departing from the scope of the present disclosure.

If release metadata already exists in the file store 108 for that particular combination of computer application and release channel (e.g., in the form of a release metadata file), the update manager 118 may be configured to retrieve the metadata from the file store at step 412 (instead of the database 116) and update the metadata file with the release information corresponding to the application release request received at step 402. The update manager may then replace the release metadata file in the file store 108 at step 416. In other embodiments, it may generate the release metadata as described with references to steps 412 and 414 and at step 416 replace the previously stored release metadata in the file store 108 with the release metadata generated at step 412.

In process 400 described above, the database 116 stores application release information for multiple computer applications and release channels, or at least a part of this application release information, in a data structure. In other embodiments of this process, the application release information may be stored in the form of metadata release files—one for each application and release channel combination. In this case, step 410 may be omitted and in step 412, the update manager 118 may retrieve the release metadata file for the computer application and release channel pair identified in step 404 from the database 116, update this file with the application release information for the current release, and restore the updated metadata file in the database 116.

Security Enhancements

To prevent unauthorized users from uploading application releases to the update system 104, the update system may utilize one or more access control mechanisms. In some embodiments, token based authentication may be utilized. To this end, the first time a developer runs the update system client 114, the update system client 114 may request the developer to register with the update system 104. This may be done, for example, by creating credentials and providing a user name, email address, etc. to the update system 104. Alternatively, it may be done by utilizing preexisting employee credentials, for example by implementing single sign-on access control.

Once credentials are received, the update system 104 may generate a unique token and send this token to the update system client 114. The client 114 subsequently uses this token whenever it communicates with the update system 104.

Figure 5:
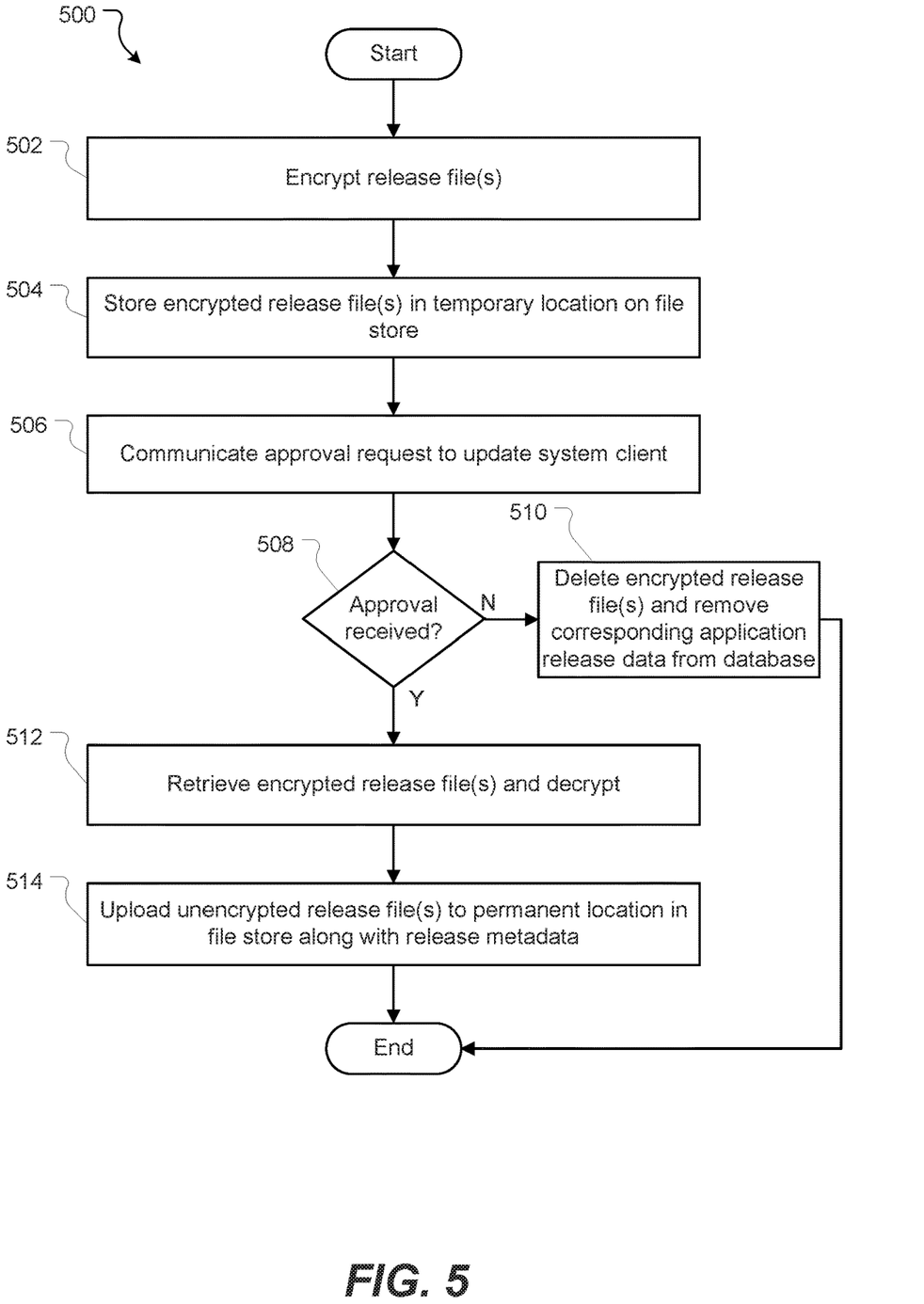
FIG. 5 is a flowchart illustrating a further operation of the update system according to aspects of the present disclosure.

In addition to this, the update system 104 may enhance security by preventing developers from uploading releases without approval. To this end, the update system 104 may incorporate a review process, whereby an authorized person is required to approve a release request before the release files can be published on the file store 108. FIG. 5 illustrates the exemplary operation performed by the update manager 118 to obtain approval. This process may be performed between steps 410 and 412 of process 400.

At step 502, the update system 104 encrypts the one or more release file(s) received from the developer computing system 102A, 102B. Any suitable encryption technique may be utilized without departing from the scope of the present disclosure.

Next, at step 504, the update manager 118 stores the encrypted file in a temporary location on the file store 108. This way, even if a user computing device 110A, 110B, 110C manages to retrieve the release file from the file store, it will not be able to read the file.

At step 506, the update manager 118 communicates an approval request to the update system client 114. In certain embodiments, when a developer who has permission to approve the release invokes the update system client 114, the developer may see the update in a release queue awaiting the developer's approval. In this case, if the developer is happy with the release, he/she may approve the release. Alternatively, the update manager 118 may be configured to alert the authorized developer that an application update is awaiting user approval. This alert may be in any form, such as an in-application message, an email, or an SMS. The authorized developer can then invoke the update system client 114 on their computing device 102A, 102B and either approve the release or cancel it.

At step 508 the update manager 118 determines whether the release request is approved or cancelled. If the request is cancelled, the process proceeds to step 510 where the update manager 118 deletes the encrypted release file from the temporary location on the file store 108 and deletes the application release information stored in the database 116 at step 410. Thereafter the process ends.

Alternatively, if the release request is approved at step 508, the process proceeds to step 512 where the update manager 118 retrieves the encrypted release file from the temporary location in the file store 108 and decrypts it.

At step 514, the unencrypted release file is positioned in the permanent location in the file store 114 (as mentioned in the release metadata) along with the corresponding release metadata data.

In process 500, the release file is encrypted before storing in the temporary location on the file store. In other embodiments, the release files can be stored in the temporary location without encryption. In this case, steps 512 and 514 are omitted.

Furthermore, in some implementation, the update manager 118 may simply store the release files in the database 116 until the release is approved. In such cases, the update manager 118 stores the release files in database 116, communicates an approval request to the update system client 114, and uploads the release files to the file store 108 in case approval is received and deletes the release files from the database 116 in case an approver rejects the release request.

User Computing Device Operation

Figure 6:
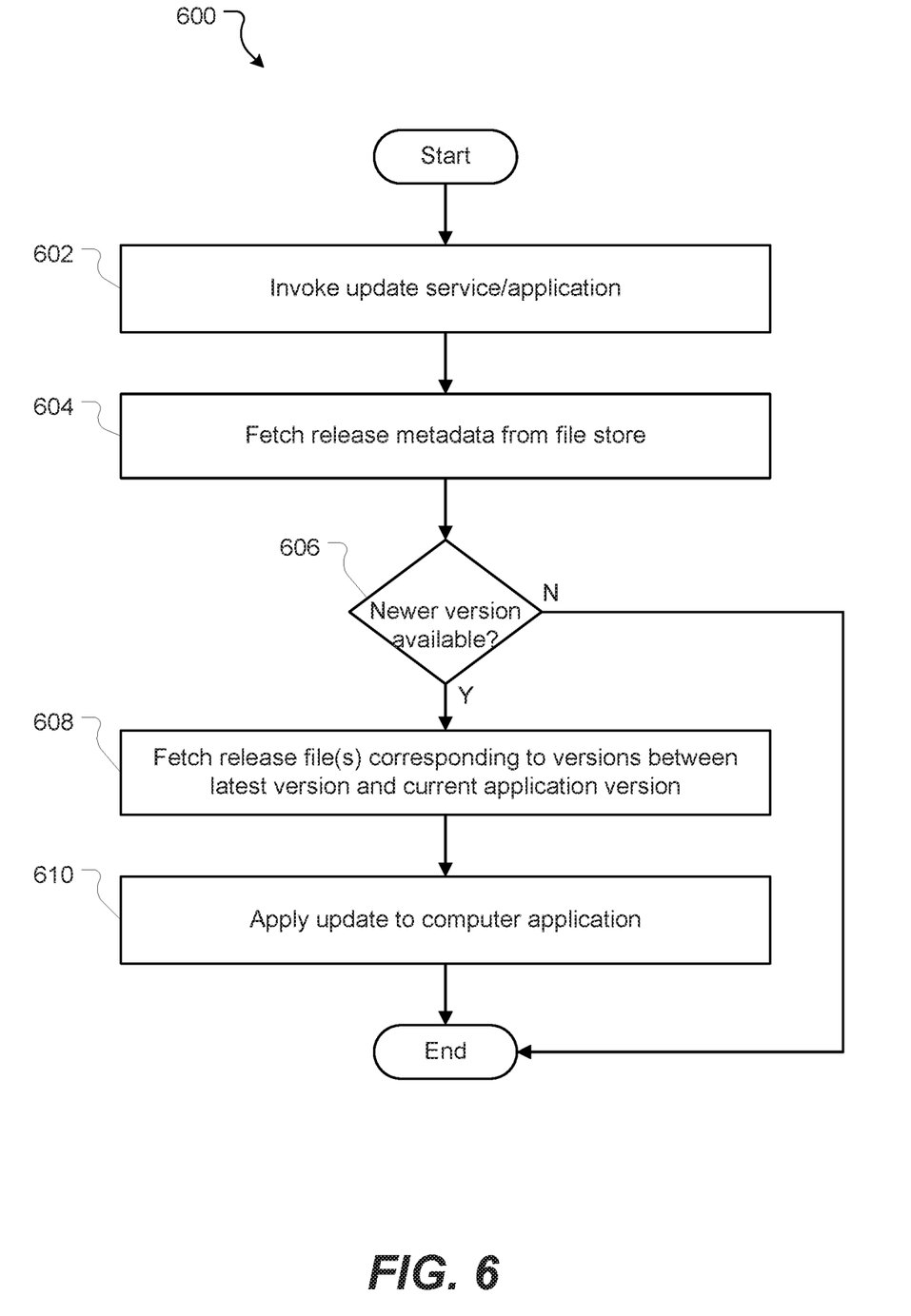
FIG. 6 is a flowchart illustrating operation of a user computing device according to aspects of the present disclosure.

FIG. 6 illustrates a process 600 for updating a computer application. The process 600 begins at step 602 where an update service/application 120A, 120B, 120C is invoked. The update service 120A, 120B, 120C may be programmed to execute whenever required and may perform updates for different computer applications at different times. For example, the update service 120A, 120B, 120C may be invoked to check for updates for some computer application whenever that computer application is launched. In other cases, the update service 120A, 120B, 120C may be configured to check for updates for one or more computer applications more periodically (e.g., every week, every day, every hour, every 15 minutes, etc.).

At step 604, the update service 120A, 120B, 120C fetches the release metadata for the corresponding computer application and operating system from the file store 108. Subsequently, (at step 606) the update service 120A, 120B, 120C checks whether the release metadata retrieved from the file store 108 indicates a more up to date version of the computer application is available. For example, the update service 120A, 120B, 120C may store a local copy of the release metadata from a previous update attempt and compare the two to determine whether any new updates are available.

If at step 606, the update service determines that a more up to date version is available, the process proceeds to step 608, where the update service 120A, 120B, 120C fetches one or more release files corresponding to the application versions between the current application version and the latest application version available.

At step 610, the update service 120A, 120B, 120C applies the one or more updates to the computer application. In certain embodiments, the update service 120A, 120B, 120C may create a new installer package from the installer package for the current computer application and the release files fetched from the file store 108 and the new installer package may be used to re-install the new version of the application. Thereafter, previous versions of the application may be deleted and the update service 120A, 120B, 120C may update its local release metadata with the latest release metadata fetched from the file store 108.

In other embodiments, it may retrieve the complete installer file from the file store 108 and forgo creating a new installer package.

At step 606, if the update service 120A, 120B, 120C determines that the current application version is the latest application version, the process 600 ends.

Some embodiments have provided a release update system having a file store that is programmed or configured to accept write or update operations only from an update manager via an authenticated connection that is established in advance using security credentials, and to accept only read requests from user computing devices without requiring an authenticated connection. With this arrangement, update service/apps of user computing devices can retrieve files from the file store using a lightweight read operation or query that does not require a special transaction, authenticated connection or other elaborate, multiple-message interoperation with the file store, thus providing a distinct benefit and improvement over an update server approach. In some embodiments, interaction with the file store can occur over a LAN so that a query or multiple rounds of messages to a distant update server are not required. The arrangement is secure because the update manager uses authenticated connections to write or update the file store, yet fast and efficient because client computers can read release metadata and/or release files from the file store without significant overhead.

Hardware Overview

The operations/techniques described herein are implemented by one or more special-purpose computing systems or devices. For example, in systems diagram 100 the developer and user computing devices 102A, 102B and 110A, 110B, 110C will typically be stand-alone computer systems, and the update system 104 and file store 108 are typically implemented by a number of interconnected computing systems.

A given computing system may be hard-wired to perform the operations described and referred to herein, or may include digital electronic devices such as one or more application-specific integrated circuits (ASICs) or field programmable gate arrays (FPGAs) that are persistently programmed to perform the operations, or may include one or more general purpose hardware processors programmed to perform the operations pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 7:
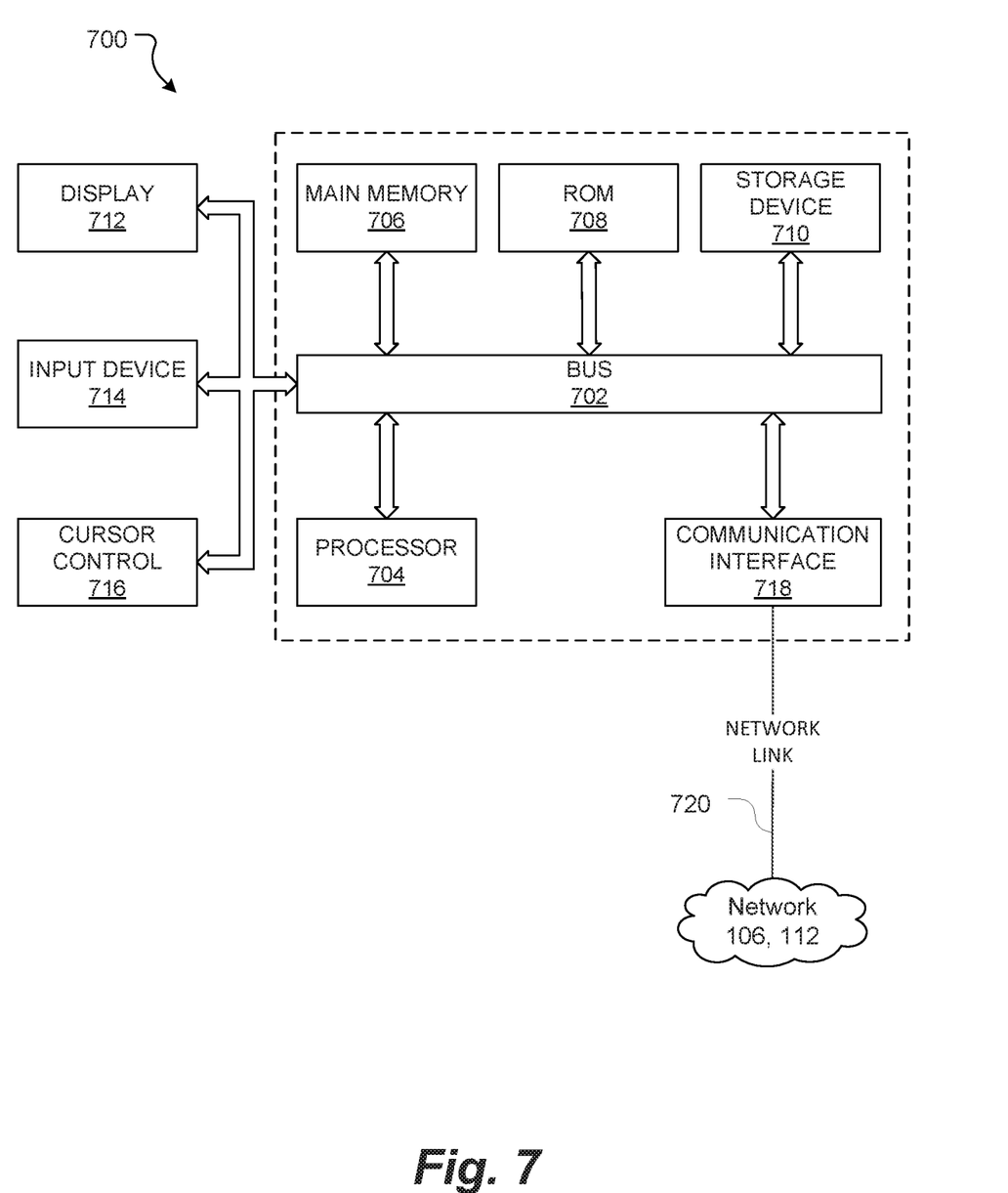
FIG. 7 is a block diagram of a computing system, which may be used to implement various features of the present disclosure.

For example, FIG. 7 is a block diagram that illustrates a computer system 700. Operations described and referred to herein may be performed by such a computer system. For example, developer and user computing devices 102A, 102B and 110A, 110B, 110C may be computer systems such as system 700.

Computer system 700 includes a bus 702 or other communication mechanism for communicating information between its various components. A hardware processor 704 for processing information is also provided, and is coupled with bus 702. Hardware processor 704 may be, for example, a general purpose microprocessor.

Computer system 700 also includes a main memory 706, such as a random access memory (RAM) or other dynamic storage device, coupled to bus 702 and for storing information and instructions to be executed by processor 704. Main memory 706 also may be used for storing temporary variables or other intermediate information during execution of instructions by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 as depicted further comprises one or more output devices such as a display 712 for displaying information. Display 712 may, for example, be a cathode ray tube (CRT), a liquid crystal display (LCD), a light emitting diode (LED display), or a touch screen display. An input device 714, such as a keyboard, keypad, touch screen, is also provided (and coupled to bus 702) for communicating information and command selections to processor 704. Another type of user input device is cursor control 716, such as a mouse, a trackball, or cursor direction keys for communicating direction information and command selections to processor 704 and for controlling cursor movement on display 712. Additional and/or alternative input and output devices may be used.

In certain embodiments, the operations disclosed herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the operations described herein. In alternative embodiments, hardwired circuitry may be used in place of or in combination with software instructions.

The term "storage media" as used herein refers to any non-transitory media that stores data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, hard disks, solid state drives, magnetic tape devices (or any other magnetic data storage medium), CDs or DVDs (or any other optical data storage medium), any physical media with patterns of holes, RAM modules, a PROM modules, EPROM modules, FLASH-EPROM modules, NVRAM modules, or any other memory chip, cartridge or device.

Storage media is distinct from, but may be used in conjunction with, transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may be carried on a portable storage medium (e.g. a disk or drive), loaded into dynamic memory, sent over a telephone line or other communication network. Bus 702 carries the instructions to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to network 106 or 112. For example, communication interface 718 may be an integrated services digital network (ISDN) card, cable modem, satellite modem, or a modem to provide a data communication link to a corresponding type of telephone line. As another example, communication interface 718 may be a network interface card which provides a data communication link to a compatible local area network. Wireless links may also be implemented. In any such implementation, communication interface 718 sends and receives electrical, electromagnetic or optical signals that carry digital data streams representing various types of information.

Network link 720 typically provides data communication through one or more networks 106 or 112 to other computing systems. For example, if the computing system 700 is a user computing device 110, the network link 720 will provide a connection through network 112 to the file store 108.

Computer system 700 can send messages and receive data, including program code, through the network(s), network link 720 and communication interface 718.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

The invention claimed is:

1. An update system located within a firewall, comprising:
a database for storing application release information for one or more previous versions of a computer application and a current version of the computer application;
a computing device communicatively coupled with the database and including an update manager configured to:
receive an application release request from a developer computing device, the application release request comprising a release file and application release information associated with the current version of the computer application;
store at least a portion of the application release information of the current version of the computer application in the database;
retrieve at least the portion of the application release information corresponding to the one or more previous versions of the computer application and the current version of the computer application from the database;
automatically generate release metadata based on the retrieved application release information;
establish an authenticated connection with a file store located outside the firewall for writing, via the authenticated connection, the release metadata and the release file as a single encrypted archive format file at a temporary location on the file store, the file store separate from the database and external to the update system;
in response to writing the release metadata and the release file to the temporary location on the file store, transmitting, an update system client located within the firewall, a request to publish the release metadata and the release file;
receive approval of the request from the update system client; and
in response to receiving the approval from the update system client:
retrieve the single encrypted archive format file from the temporary location on the file store;
decrypt the single encrypted archive format file; and
write, via the authenticated connection, the release file and the release metadata in an unencrypted file format to the file store.

2. The update system of claim 1, wherein the release metadata comprises information about location of release files corresponding to the one or more previous versions of the computer application and information about location of the release file associated with the current version of the computer application.

3. The update system of claim 2, wherein the file store is configured to permit access from an update service executing on the user computing device using only read operations and no write or update operations.

4. The update system of claim 1, wherein the update manager is configured to generate the release metadata for one or more release channels associated with the computer application.

5. A computer-implemented method comprising:
receiving, by an update system located within a firewall from a developer computing device, an application release request, the application release request comprising a release file and application release information associated with a current version of a computer application;

automatically generating, by the update system, release metadata for the computer application, the release metadata comprising information about location of the release file associated with the current version of the computer application and information about the location of one or more release files associated with one or more previous versions of the computer application;

establishing, by the update system, an authenticated connection with a file store located outside the firewall;

writing, via the authenticated connection, the release metadata for the computer application and the release file associated with the current version of the computer application to a temporary location on the file store that is located outside the firewall in response to writing the release metadata and the release file to the temporary location on the file store, transmitting, to an update system client, a request to publish the release metadata and the release file;

receiving approval of the request from the update system client located within the firewall; and     in response to receiving the approval from the update system client:

retrieving the single encrypted archive format file from the temporary location on the file store;

decrypting the single encrypted archive format file; and         writing, via the authenticated connection, the release file and the release metadata in an unencrypted file format to the file store.

6. The method of claim 5, further comprising storing, as part of the release metadata, information about location of release files corresponding to the one or more previous versions of the computer application and information about location of the release file associated with the current version of the computer application.

7. The method of claim 5, further comprising the file store permitting access from an update service executing on the user computing device using only read operations and no write or update operations.

8. The method of claim 5, further comprising generating the release metadata for one or more release channels associated with the computer application.

9. A method for updating a computer application, the method comprising:

communicatively coupling a user computing device outside a firewall with a file store located outside the firewall, the file store configured to:

accept data, including release files, from an update manager located inside the firewall via an authenticated connection to be stored as a single encrypted archive format file at a temporary location in the file store,     accept read operations from user computing devices without requiring an authenticated connection;

accept retrieve operations, from the update manager, of the single encrypted archive format file stored at the temporary location; and     accept write operations of the release files and release metadata in an unencrypted file format to the file store;

retrieving, at the user computing device, from the file store, release metadata in the unencrypted file format by using a first lightweight read operation, the release metadata comprising information of a current version of the computer application and information about a location of a release file associated with the current version of the computer application;

determining, by the user computing device, based on the retrieved release metadata whether the computer application needs to be updated, the determining based on a comparison of the current version of the computer application and a version of the computer application installed on the user computing device;

in response to determining that the computer application needs to be updated, retrieving, by the user computing device, from the file store, the release file in the unencrypted file format by using a second lightweight read operation, the release file retrieved based on the information about the location of the release file in the release metadata;

updating, by the user computing device, the computer application using the retrieved release file.

10. The method of claim 9, wherein retrieving the release metadata comprises retrieving release metadata associated with the computer application for a particular release channel.

\* \* \* \* \*